US010244354B2

United States Patent
High et al.

(10) Patent No.: US 10,244,354 B2
(45) Date of Patent: *Mar. 26, 2019

(54) DYNAMIC ALERT SYSTEM IN A FACILITY

(71) Applicant: Walmart Apollo, LLC, Bentonville, AR (US)

(72) Inventors: Donald Ray High, Noel, MO (US); Matthew Allen Jones, Bentonville, AR (US); Joseph Courtland Halbrook, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,754

(22) Filed: Jun. 13, 2018

(65) Prior Publication Data

US 2018/0295472 A1    Oct. 11, 2018

Related U.S. Application Data

(63) Continuation of application No. 15/810,683, filed on Nov. 13, 2017, now Pat. No. 10,028,094.
(Continued)

(51) Int. Cl.
*H04W 4/02* (2018.01)
*H04W 4/08* (2009.01)
(Continued)

(52) U.S. Cl.
CPC ........... *H04W 4/023* (2013.01); *G06Q 30/00* (2013.01); *G06Q 30/02* (2013.01); *H04L 67/12* (2013.01);
(Continued)

(58) Field of Classification Search
CPC ....... H04W 4/023; H04W 4/08; H04W 8/186; H04W 8/18; H04W 4/02; H04W 4/14;
(Continued)

(56) References Cited

U.S. PATENT DOCUMENTS

2004/0100364 A1*  5/2004  Giraldin ................ G06Q 30/02
                                                       340/7.28
2005/0228719 A1  10/2005  Roberts et al.
(Continued)

OTHER PUBLICATIONS

Opencart Marketplace Auction, Vendor Bidding Module—Webkul, https://store.webkul.com/OpencartMarketplaceAuction.html, last viewed Jul. 25, 2016.
(Continued)

*Primary Examiner* — Brandon J Miller
(74) *Attorney, Agent, or Firm* — McCarter & English, LLP; David R. Burns

(57) ABSTRACT

Described in detail herein are methods and systems for dynamically transmitting alerts. Sensors disposed in a facility can detect mobile devices roaming around the facility when they are within range of the sensor. The sensor can transmit the location an identification information of the mobile devices to a computing system. The computing system can determine physical objects disposed within a predetermined distance to the mobile devices. The computing system can determine if at least one physical object is of interest to the users of the mobile devices. The computing system can transmit an alert including information associated with the physical object and generate a messaging interface on the mobile devices. The computing system can prompt the users of the mobile devices to input information associated with the physical object. The computing system can dynamically update the database based on the information input associated with the physical object.

20 Claims, 5 Drawing Sheets

Related U.S. Application Data

(60) Provisional application No. 62/432,775, filed on Dec. 12, 2016.

(51) Int. Cl.
    *H04W 4/14*        (2009.01)
    *H04W 8/18*        (2009.01)
    *G06Q 30/00*      (2012.01)
    *G06Q 30/02*      (2012.01)
    *H04L 29/08*      (2006.01)
    *H04M 1/725*     (2006.01)

(52) U.S. Cl.
 CPC ... *H04M 1/72552* (2013.01); *H04M 1/72572* (2013.01); *H04W 4/02* (2013.01); *H04W 4/08* (2013.01); *H04W 8/18* (2013.01); *H04W 8/186* (2013.01); *H04W 4/14* (2013.01)

(58) Field of Classification Search
 CPC .......... H04M 1/72552; H04M 1/72572; H04L 67/12; G06Q 30/02; G06Q 30/00
 See application file for complete search history.

(56) References Cited

U.S. PATENT DOCUMENTS

| | | |
|---|---|---|
| 2007/0198355 A1 | 8/2007 | Samson et al. |
| 2009/0012704 A1 | 1/2009 | Franco et al. |
| 2009/0112733 A1 | 4/2009 | Horowitz |
| 2009/0171853 A1 | 7/2009 | Georgiou et al. |
| 2009/0187466 A1 | 7/2009 | Carter et al. |
| 2012/0036014 A1 | 2/2012 | Sunkada |
| 2012/0064855 A1 | 3/2012 | Mendelson |
| 2012/0290349 A1* | 11/2012 | Burkhart ............... G06Q 30/06 705/7.13 |
| 2012/0329486 A1* | 12/2012 | Gits ........................ H04W 4/12 455/466 |
| 2013/0151366 A1 | 6/2013 | Godsey |
| 2014/0108179 A1 | 4/2014 | Zhu et al. |
| 2014/0207570 A1 | 7/2014 | Cancro et al. |
| 2014/0324627 A1 | 10/2014 | Haver et al. |
| 2015/0112790 A1 | 4/2015 | Wolinsky et al. |
| 2017/0245125 A1* | 8/2017 | Child ..................... H04W 4/12 |

OTHER PUBLICATIONS

Product Auction—Ecommerce Plugins for Online Stores—Shopify App Store, https://apps.shopity.com/productauction, last viewed Jul. 25, 2016.

International Search Report and Written Opinion from related international patent application No. PCT/US2017/060916 dated Jan. 16, 2018.

Product Auction—Ecommerce Plugins for Online Stores—Shopify App Store, https://apps.shopify.com/productauction, last viewed Jul. 25, 2016.

U.S. Appl. No. 15/810,683, filed Nov. 13, 2017, Donald Ray High et al.

* cited by examiner

DYNAMIC ALERT SYSTEM IN A FACILITY

CROSS-REFERENCE TO RELATED PATENT APPLICATIONS

This application is a continuation of U.S. patent application Ser. No. 15/810,683 filed on Nov. 13, 2017, which claims priority to U.S. Provisional Application No. 62/432,775 filed on Dec. 12, 2016. The content of each application is hereby incorporated by reference in their entirety.

BACKGROUND

It may be desirable to communicate with mobile users in a facility to provide information to the users about object within the facility.

BRIEF DESCRIPTION OF DRAWINGS

Illustrative embodiments are shown by way of example in the accompanying drawings and should not be considered as a limitation of the present disclosure.

DETAILED DESCRIPTION

Figure 1:
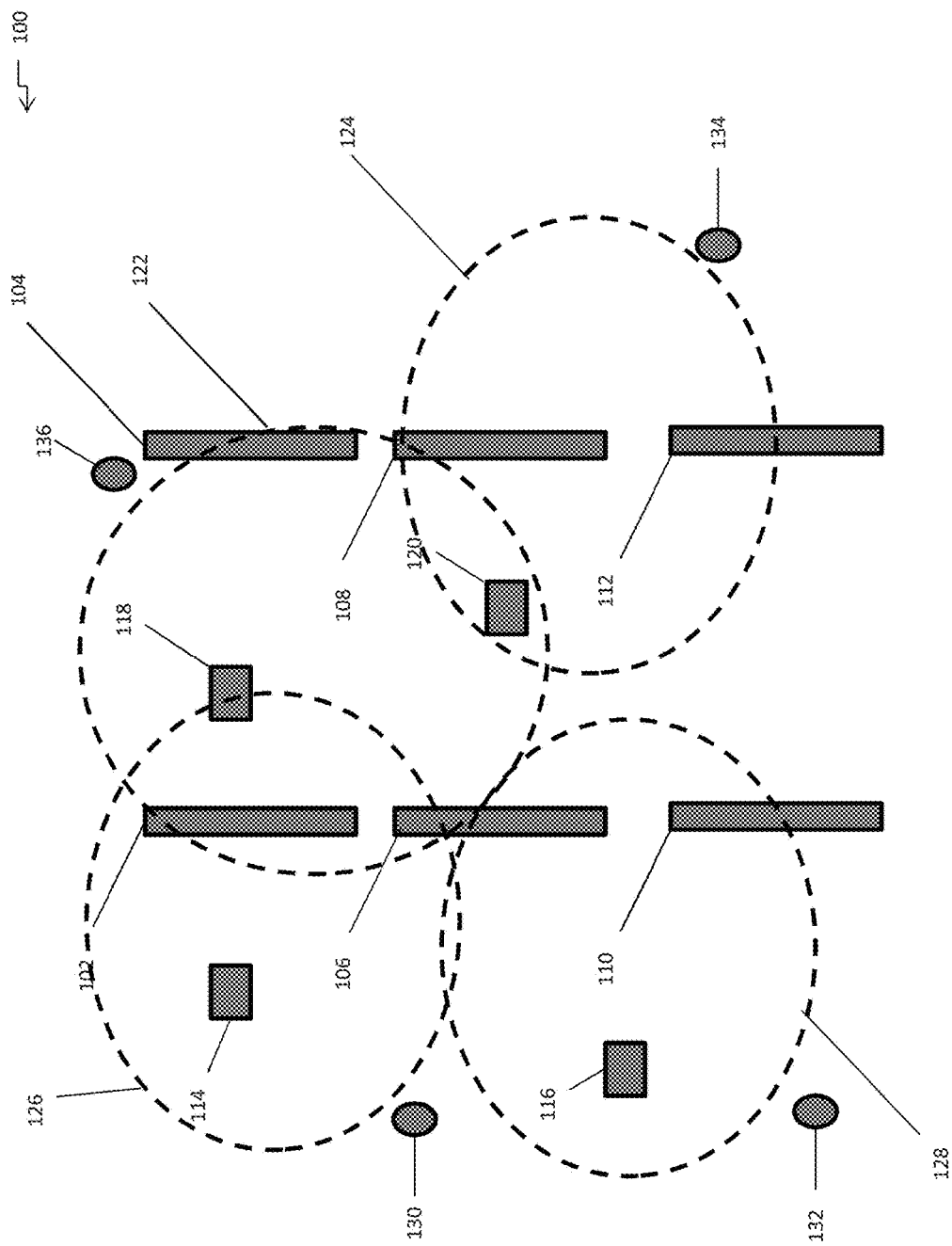
FIG. 1 is a diagram of an environment within a dynamic alerting system is implemented according to embodiments of the present disclosure.

Described in detail herein are methods and systems for dynamically transmitting alerts in an environment. Sensors disposed in a facility can detect mobile devices in the facility as the mobile devices move through the facility. The sensors can transmit identification information of the detected mobile devices to a remote computing system, which can determine location of the mobile devices in the facility based on the locations of the sensors that detect the mobile devices (e.g., via triangulation when more than one sensor detects the same mobile device). In response to ascertaining locations of the mobile devices, the remote computing system can identify physical objects disposed within a specified distance to the mobile devices. The computing system can determine whether at least one of the identified physical objects identified may be of interest to a user of a detected mobile device in the vicinity of the physical objects. The computing system can transmit an alert including information associated with the physical object and generate a messaging interface on the mobile devices. The computing system can prompt the users of the mobile devices to input information associated with the physical object. The computing system can dynamically update the database based on the information input associated with the physical object.

In exemplary embodiments, the dynamic alert system can ascertain mobile device locations of mobile devices associated with users via a computing system in communication with the mobile devices. The computing system can determine that the mobile device locations coincide with one or more areas in a facility and can retrieve user data associated with the users of the mobile devices from a database. The computing system can dynamically group the users into one or more groups based on the user data, and can generate a message for each of the one or more groups. The content of the message to each group can be different and can include information associated with at least one of the physical objects in the facility based on the device locations coinciding with one or more areas in the facilitate. The computing system can transmits each message to the mobile devices associated with the users in each of the one or more groups.

Upon detecting mobile devices, the sensor(s) can encode identification information associated with each of the detected mobile devices into electrical signals and can transmit the electrical signals to the remote computing system. The computing system can process and decode the electrical signals to determine the device locations.

A messaging interface can be generated on a subset of mobile devices associated with a subset of users that are in a group in response to generating the message for the group. After the computing system sends a message to the mobile devices (or a subset of the mobile devices) associated with a group and generates a messaging interface on the mobile devices in the group (or a subset of mobile devices), communications between the mobile devices (or subset of mobile devices) in the group can be established via the messaging interface. That is, the computing system dynamically generates the group of mobile devices based on, e.g., a location of the mobile devices, and user data associated with physical objects at the locations and subsequently establishes a communication interface between the mobile devices in the group. The communications can be associated with information associated with the at least one physical object. The computing system can dynamically change the information associated with the at least one physical object based on the communications from the mobile devices (or subset of mobile devices) in the group. The messages can be transmitted using a Short Messaging Service (SMS) format and can be transmitted from the computing system to the mobile devices from a proxy telephone number.

FIG. 1 is a diagram of an environment within which a dynamic alerting system is implemented according to embodiments of the present disclosure. In exemplary embodiments, storage units 102-112 can be disposed throughout a facility 100. The storage units 102-112 can store physical objects. Sensors 130-136 can be disposed throughout the facility, and can be configured to detect mobile devices 114-120 in the facility 100 as the mobile devices move through the facility. The sensors 130-136 can be radiofrequency (RF) receivers including, for example, RFID readers, Bluetooth® receivers, Near Field Communications (NFC) receivers, WiFi access points, and/or any suitable RF receivers configured to detect mobile devices 114-120. Each of the sensors 130-136 can detect mobile devices 114-120 with in a specific range in response to transmissions from the mobile devices 114-120. For example, the sensor 130 can detect mobile devices within the range defined by the area 126, the sensor 132 can detect mobile devices within the range of the area 128, the sensor 134 can detect the mobile devices within the range of the area 124 and the sensor 136 can detect the mobile devices within the range of 122. Accordingly, the sensor 130 can detect the mobile device 114, the sensor 132 can detect the mobile device 116, the sensor 134 can detect the mobile device 120 and the sensor 136 can detect the mobile devices 118 and 120. In some embodiments, the sensors 130-136 can detect the locations of the mobile devices 114-120 or can be used to determine the locations of the mobile devices 114-120. The sensors 130-136 can also detect identification information of the mobile devices 114-120, such as a Unique Device ID (UDID), the International Mobile Equipment Identity (IMEI), Integrated Circuit Card Identifier (ICCID) and/or the Mobile Equipment Identifier (MEID). The sensors 130-136 can encode the locations and/or the identification information of the mobile devices 114-120 into electrical signals and transmit the electrical signals to a computing system.

Figure 2:
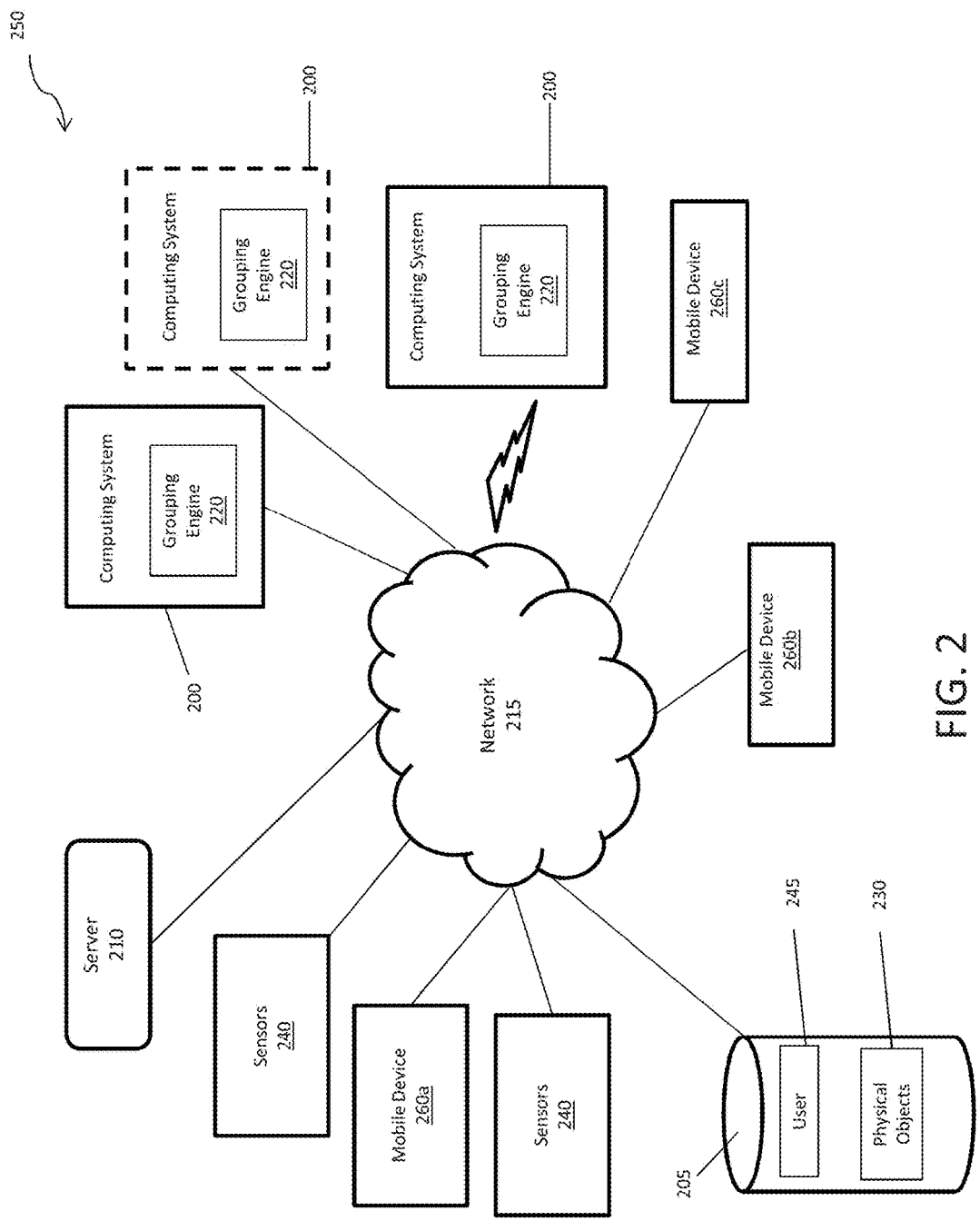
FIG. 2 illustrates an exemplary dynamic alert system in accordance with embodiments of the present disclosure.

FIG. 2 illustrates an exemplary dynamic alert system 250 in accordance with embodiments of the present disclosure. The dynamic alert system 250 can be implemented in the context of the facility 100 shown in FIG. 1. The dynamic alert system 250 can include one or more databases 205, one or more servers 210, one or more computing systems 200, the sensors 240, and mobile devices 260. In exemplary embodiments, the computing system 200 can be in communication with the databases 205, the server(s) 210, the sensors 240, and mobile devices 260*a-c* via a communications network 215. The computing system 200 can implement at least one instance of a dynamic grouping engine 220 configured to implement dynamic alert processes of the dynamic alert system 250.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the network 215. The server 210 hosts one or more applications configured to interact with one or more components of the computing system 200 and/or facilitates access to the content of the databases 205. In some embodiments, the server 210 can host the grouping engine 220 or portions thereof. The databases 205 may store information/data, as described herein. For example, the databases 205 can include a physical objects database 230 and the user database 245. The physical objects database 230 can store physical objects disposed in a facility. The user database 245 can include information associated with the users of the mobile devices. The databases 205 and server 210 can be located at one or more geographically distributed locations from each other or from the computing system 200. Alternatively, the databases 205 can be included within server 210.

In exemplary embodiments, the computing system 200 can receive electrical signals from the sensors 240 in response to the sensors 240 detecting transmissions from mobile devices 260 in the facility. The computing system 200 can execute the grouping engine 220 in response to receiving the electrical signals from the sensors 240. The grouping engine 220 can decode identification information in encoded in the electrical signals and associated with mobile devices 260 and can ascertain locations of the mobile devices 260 (e.g., based on which sensors detected the mobile devices and/or a strength of the signals received by the sensors from the mobile devices). The grouping engine 220 can determine more than two or more of the mobile devices 260 are within a specified distance of one another. For example, the grouping engine 220 can determine mobile devices 260*a-b* are within a predetermined distance of each other within the facility. The grouping engine 220 can query the physical objects database 230 to retrieve physical objects disposed within a predetermined distance of the mobile devices 260*a-b*, using the location information of the mobile devices 260.

The identification information of the mobile devices 260*a-b* can also include information associated with the user of the mobile devices 260*a-b*. The grouping engine 220 can query the user database 245 using the identification information of the mobile devices 260*a-b* and the retrieved physical objects disposed within a predetermined distance to the mobile devices 260*a-b* to retrieve user information associated with the retrieved physical objects. The grouping engine 220 can transmit an alert to the mobile devices 260 associated with at least one of the retrieved physical objects disposed in the facility. The alert can be a message sent by SMS to the mobile devices 260*a-b*. In some embodiments, the mobile devices 260*a-b* can execute an application associated with the facility. The alert can be transmitted and displayed on the application.

The grouping engine 220 can determine a physical object can be of interest to more than one user based on the retrieved user information. The grouping engine 220 can dynamically group the mobile devices of the users together based on the locations of the mobile devices and the user information associated with the physical object and can transmit a message to the dynamically generated group of mobile devices. The grouping engine 220 further generate a messaging interface between mobile devices 260*a-b* and prompt the users of mobile devices in the group to join the messaging interface. The users of the mobile devices 260*a-b* can transmit messages associated with the physical object on the messaging interface. Information stored in the physical objects database 230, associated with the physical object can dynamically change based on the messages on the messaging interface. The messaging interface can be a Short Messaging Service (SMS) messaging interface. In some embodiments, the messaging interface can be generated within an application being executed on the mobile devices. Alternatively, the grouping engine 220 can generate proxy telephone numbers for the mobile devices 260*a-b* and the messaging interface can be a SMS messaging interface between the generated proxy telephone numbers of the mobile devices 260*a-b*.

As a non-limiting example, the dynamic alert system 250 can be implemented in a retail store. The sensors 240 can be disposed in the retail store with respect to shelving units in which products sold at the retail store are disposed. The mobile devices 260*a-c* can be operated by users roaming the retail store. The users can be store customers of the retail store. In exemplary embodiment, the mobile devices 260*a-c* can move into the range of various sensors 240. The sensors can detect the mobile devices 260*a-c*, encode the identification information of the mobile devices and the locations of the mobile devices into electrical signals and transmit the electrical signals to the computing system 200. The computing system 200 can execute the grouping engine 220 in response to receiving the electrical signals.

The grouping engine 220 can decode the identification information of the mobile devices 260*a-c* and the location information of the mobile devices 260*a-c* from the electrical signals. The identification information can include information associated with the user operating the mobile devices. For example, the mobile devices can be executing a web-application associated with the retail store and/or can be executing a mobile application configured to interface with the dynamic alert system 250. The identification information can include the users' web-application or mobile application account information. The grouping engine 220 can determine mobile device 260a and mobile device 260b are within a predetermined location of one another. The grouping engine 220 can query the physical objects database 230 using the location information of the mobile devices 260a-b, to retrieve products stored on shelving units within a predetermined distance of the mobile devices 260a-b. The grouping engine 220 can query the user database 245 using the identification information associated with the mobile devices 260a-b and the retrieved products to retrieve an unsold product that can be of interest to either the user of mobile device 260a, the user of mobile device 260b or both. For example, user database 245 can store user transaction history and/or recent products the user may have researched and/or looked at. The grouping engine 220 can determine that the user of mobile device 260a and/or mobile device 260b has been buying and/or researching a product within a predetermined distance of the mobile devices 260a and/or 260b. Furthermore, the grouping engine 220 can determine the product has not been sold for more than a specified amount of time. The grouping engine 220 can determine that the product may be a product of interest to the users of mobile device 260a and/or 260b.

In some instances, the grouping engine 220 can determine the product may be of interest to only one of the users, such as the user of the mobile device 260a. The grouping engine 220 can transmit an alert to the mobile device 260a associated with the product. The alert can be transmitted and displayed on the web-application or mobile application executed on the mobile device 260a. Alternatively, the alert can be transmitted using SMS protocol. The alert can inform the user of the available product that may be of interest to the user. The alert can include information associated with the product along with an option to input a desired price for the product. The user can input a desired price for the product and the grouping engine 220 can determine whether the desired price is within a predetermined threshold. The grouping engine 220 can prompt the user on the mobile device 260a to pay for the product at the desired price, in response to determining the desired price is within a predetermined threshold. In response to determining the desired price is not within the predetermined threshold for the product, the grouping engine 220 can recommend a different price to purchase the product. The recommended price can be a price within the predetermined threshold of the product. The grouping engine 220 can prompt the user to enter a newly desired price which is different than the previously desired price or accept the recommend price on the mobile device 260a. The grouping engine 220 can store the desired prices entered by the user in the physical objects and user database 230 and 245.

In some instances, the grouping engine 220 can determine the product may be of interest to more than one user, such as the users of the mobile devices 260a and 260b. The grouping engine 220 can dynamically group the users of the mobile devices 260a-b. The grouping engine 220 can transmit an alert to the group of mobile devices 260a-b. The alert can include information associated with the product of interest. The alert can also include an option to enter into a messaging interface. The grouping engine 220 can generate a messaging interface in the web application or mobile application on the mobile devices 260a-b, in response to the users of the mobile devices 260a-b selecting the option to enter a messaging interface. Alternatively, the grouping engine 220 can generate proxy telephone numbers for the mobile devices 260a-b and generate a messaging interface using SMS protocol for the generated proxy telephone numbers. The grouping engine 220 can initiate an auction of the product on the messaging service. The users can enter a desired price for the product using the respective mobile devices 260a-b, starting a bidding process for the product. Each user can be prompted to enter a higher bid than the previous bid. The messaging interface can include an auto-bid option in which the user's bid is incremented by a predetermined amount up to a predetermined threshold. The bidding process can be limited to a predetermined time interval. The predetermined time interval can be incremented by a predetermined amount if a bid is placed within a predetermined portion of remaining time of the time interval. The user with the highest bid at the end of the predetermined time interval can be prompted to purchase the product at the highest bid. In the event the user with the highest bid does not complete the purchase of the product within a predetermined amount of time, the grouping engine 220 can prompt the user of the second highest bid to purchase the product for the price equaling the second highest bid. In some embodiments, the grouping engine 220 can determine whether the highest bid is within a predetermined threshold price of the product. In response to determining the highest bid is not within the predetermined threshold price, the grouping engine 220 can prompt the users to increase the bid and increase the time interval of the bidding process. In some embodiments, the user with the highest bid can choose to pick the product up in the store, or have it delivered to an address.

Figure 3:
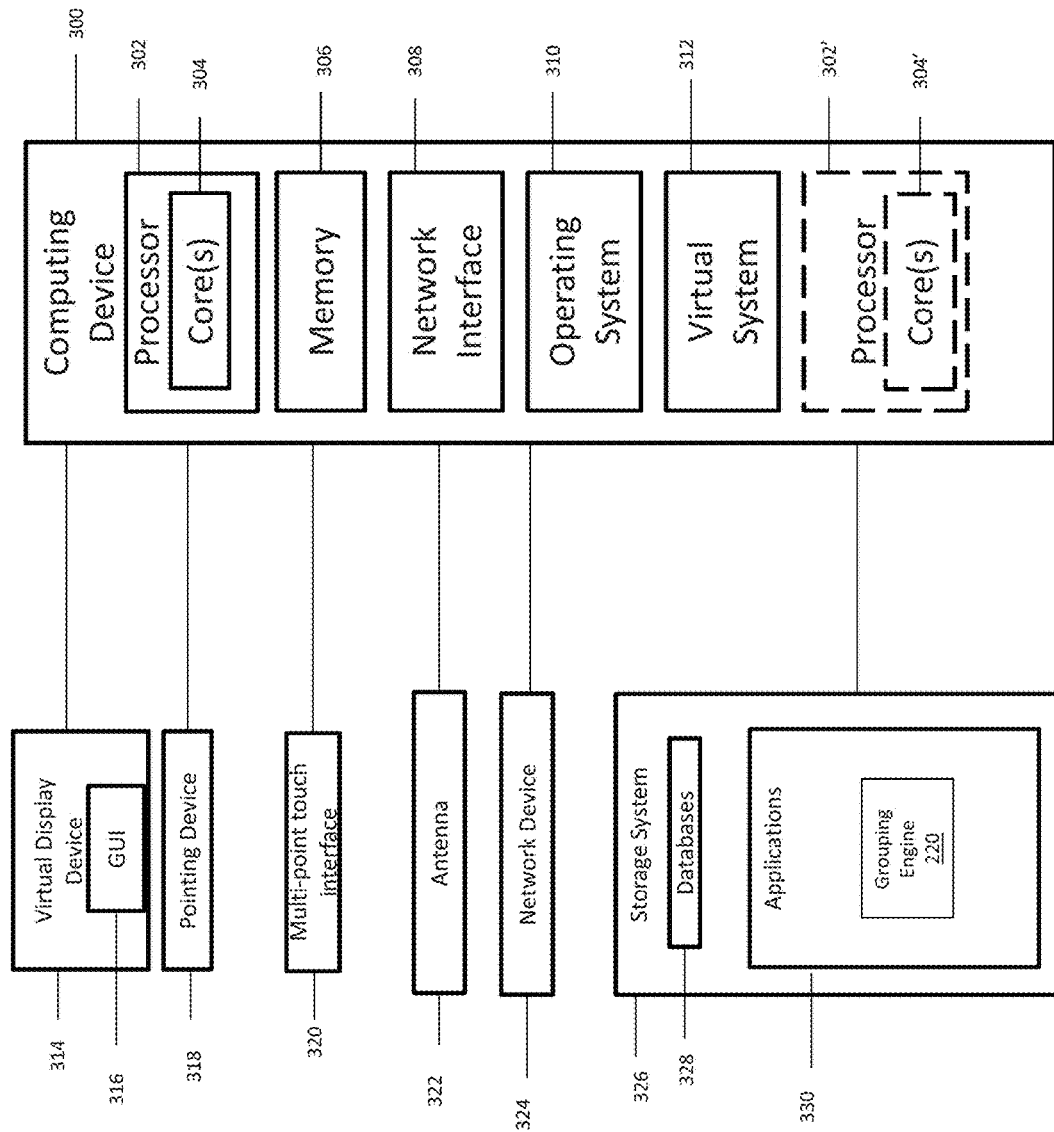
FIG. 3 illustrates an exemplary computing device in accordance with embodiments of the present disclosure.

FIG. 3 is a block diagram of an example computing device 300 for implementing embodiments of the present disclosure. Embodiments of the computing device 300 can implement embodiments of the grouping engine. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the grouping engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320, and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding the physical objects and the users. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
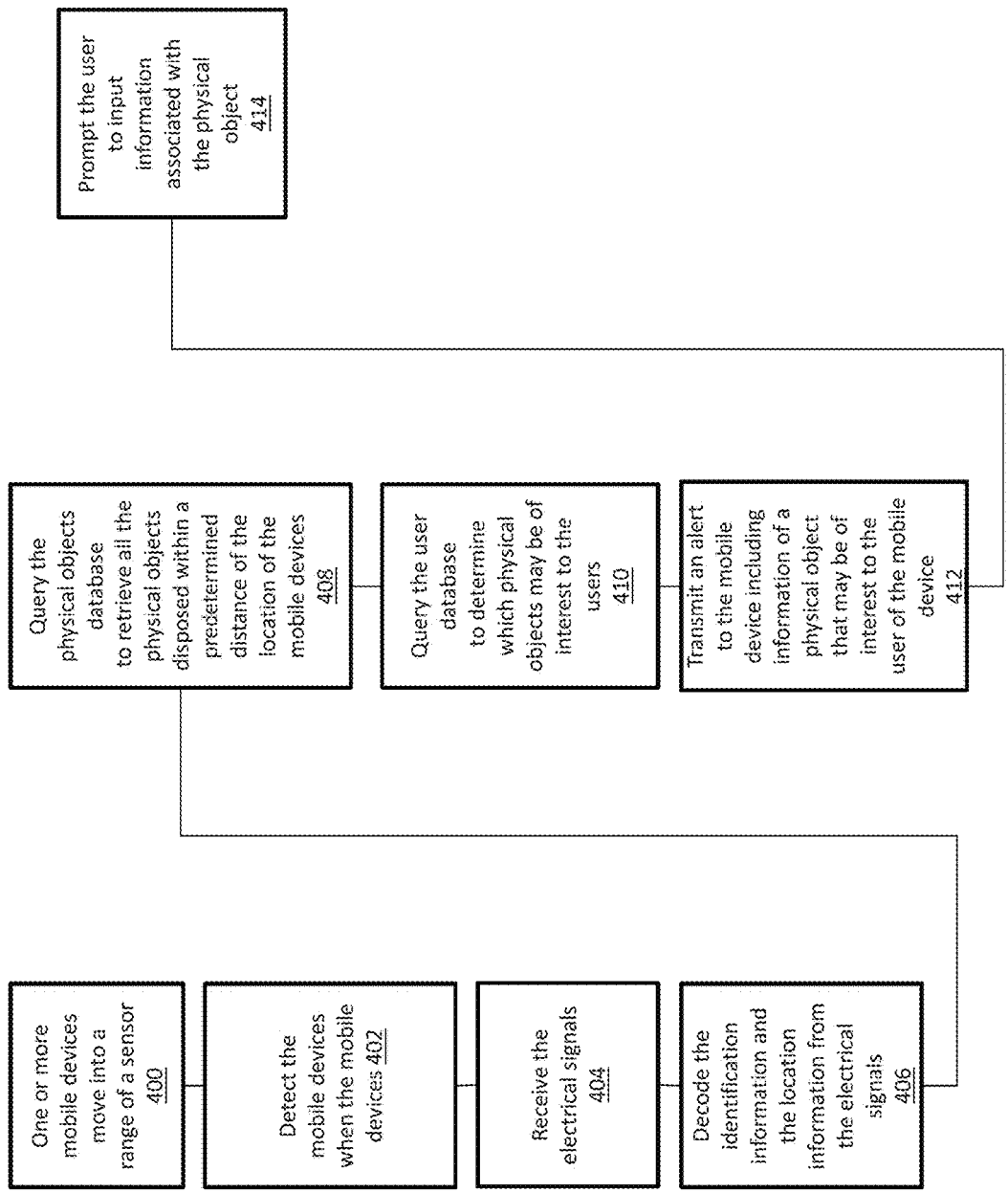
FIG. 4 is a flowchart illustrating a dynamic alert process according to embodiments of the present disclosure.

FIG. 4 is a flowchart illustrating a process implemented by an dynamic alert system according to embodiments of the present disclosure. In operation 400, one or more mobile devices (e.g. mobile devices 114-120 and 260a-c as shown in FIGS. 1 and 2) can move into a range (e.g. ranges 122-128 as shown in FIG. 1) of one or more sensors (e.g. sensors 130-136 and 240 as shown in FIGS. 1 and 2) disposed in a facility (e.g. facility 100 as shown in FIG. 1). The facility can include shelving units (e.g. shelving unites 102-112 as shown in FIG. 1) storing physical objects. In operation 402, the sensors can detect the mobile devices when the mobile devices come into the range of the sensor. The sensors can encode the location and/or identification information of the detected mobile device into electrical signals and transmit the electrical signals to a remote computing system (e.g. computing system 200 as shown in FIG. 2).

In operation 404, the computing system can receive the electrical signals. The computing system can execute the grouping engine (e.g. grouping engine 220 as shown in FIG. 2) in response to receiving the electrical signals. In operation 406, the grouping engine can decode and/or ascertain the identification information and the location information from the electrical signals. The identification information can include the mobile device information and user information. In operation 408, the grouping engine can query the physical objects database (e.g. physical objects database 230 as shown in FIG. 2) using the location information of the mobile devices to retrieve the physical objects disposed within a predetermined distance of the location of the mobile devices. In operation 410, the grouping engine can query the user database (e.g. user database 245 as shown in FIG. 2) using the identification information and retrieved physical objects to determine which physical objects may be of interest to the users of the mobile devices. In operation 412, the grouping engine can transmit an alert to the mobile devices including information of a physical object that may be of interest to the user of the mobile device. In operation 414, the grouping engine can prompt the users of the mobile devices to input information associated with the physical object. The physical objects database can dynamically adjust the information in the physical objects database in response to the user inputting information associated with the physical object. The grouping engine can also determine more than one mobile device is within a specified distance of the physical object and that the user of the other mobile device(s) can be interested in the physical object. The grouping engine can generate a messaging interface to prompt the user to enter information associated with the physical object. The physical object database can dynamically update information stored in the physical objects database in response to the information input by the users.

Figure 5:
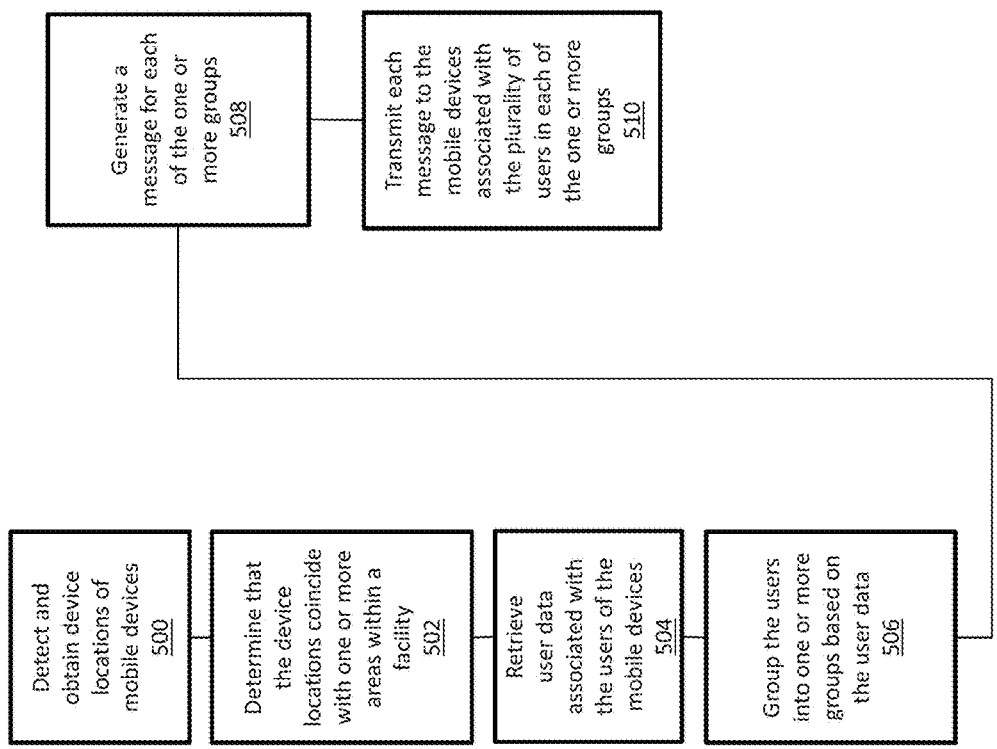
FIG. 5 is a flowchart illustrating a process implemented by an dynamic alert system according to embodiments of the present disclosure.

FIG. 5 is a flowchart illustrating a process implemented by an dynamic alert system according to embodiments of the present disclosure. In operation 500, a computing system (e.g computing system 200 as shown in FIG. 2) can detect and obtain device locations of mobile devices (e.g. mobile devices 114-120 and 260a-c as shown in FIGS. 1 and 2) associated with users within a facility. The computing system 200 can execute the grouping engine (e.g. grouping engine 220 as shown in FIG. 2) in response to detecting the mobile devices. In operation 502, the grouping engine can determine that the device locations coincide with one or more areas within a facility. Physical objects can be disposed in the one or more areas of the facility. In operation 504, the grouping engine 220 can retrieve, from the user database (e.g. user database 245 as shown in FIG. 2), user data associated with the users of the mobile devices. The grouping engine can use the identification information captured from the mobile devices to retrieve the user data from the user database. In operation 506, the grouping engine can dynamically group the users into one or more groups based on the user data and the locations of the mobile devices. In operation 508, the grouping engine can generate a different message for each of the one or more groups. The content of the message is different for each group and includes information associated with at least one of the physical objects in the facility based on the one or more areas within the facilitate that coincide with the device locations. The grouping engine can generate a messaging interface on each the mobile devices in each of the groups to transmit and display the different messages. For example, the grouping engine can generate an SMS interface using a proxy telephonic number. Alternatively, the grouping engine can generate the messaging interface within a web-application or mobile application running on the mobile devices. In operation 510, the grouping engine can transmit each different message to the corresponding group of mobile devices to output the message on the messaging interface on a group-by-group basis.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A dynamic alert system in a facility, the system comprising:
    a plurality of sensors disposed in the facility selectively detecting a plurality of mobile devices based on a location of each of the mobile devices in the plurality of mobile devices;
 a computing system in communication with the plurality of mobile sensors, the computing system configured to:
    obtain device locations of the plurality of mobile devices from the sensors;
    determine that the device locations coincide with one or more areas within a facility including a plurality of physical objects;
    group the plurality of mobile devices into one or more groups based on the device locations;
    generate a message for each of the one or more groups, wherein the content of the message is different for each group and includes information associated with at least one of the plurality of physical objects in the facility based on the one or more areas within the facility that coincide with the device locations; and
    transmit each message to the plurality of mobile devices in each of the one or more groups.

2. The system in claim 1, wherein at least one of the plurality of sensors configured to:
    detect the plurality of mobile devices within a predetermined distance of the at least one of the plurality of sensors;
    determine the device locations of the plurality of the mobile devices based on detection by the at least one of the plurality of sensors;
    encode the device locations in electrical signals; and
    transmit the electrical signals to the computing system.

3. The system in claim 2, wherein the computing system decodes the electrical signals to determine the device locations.

4. The system in claim 3, wherein the at least one of the plurality of physical object is within a predetermined distance of the device locations.

5. The system in claim 1, wherein in response to generating the message for each of the one or more groups, the computing system is further programmed to:
    generate a messaging interface on a subset of mobile devices of the plurality of mobile devices associated with a subset of users of the plurality of users in at least one group.

6. The system in claim 5, wherein communications between the subset of mobile devices are established via the messaging interface.

7. The system in claim 6, wherein the communications are associated with information associated with the at least one physical object.

8. The system in claim 7, wherein the computing system is further programmed to dynamically change the information associated with the at least one physical object based on the communications.

9. The system in claim 1, wherein the message is in a Short Messaging Service (SMS) format and is transmitted to the plurality of mobile devices from a proxy telephone number.

10. A dynamic alerting method in a facility, the method comprising:
    ascertaining device locations of a plurality of mobile devices via a computing system in communication with a plurality of sensors configured to detect the plurality of mobile devices;
    determining, via the computing system, that the device locations coincide with one or more areas within a facility including a plurality of physical objects;
    grouping, via the computing system, the plurality of mobile devices into one or more groups based on the device locations;
    generating, via the computing system, a message for each of the one or more groups, wherein the content of the message is different for each group and includes information associated with at least one of the plurality of physical objects in the facility based on the one or more areas within the facility that coincide with the device locations; and
    transmitting, via the computing system, each message to the plurality of mobile devices in each of the one or more groups.

11. The method in claim 10, further comprising:
    detecting the plurality of mobile devices via at least one of a plurality of sensor disposed in the facility;
    determining the device locations of the plurality of the mobile devices based on detection of the plurality of mobile devices by the at least one of the plurality of sensors;
    encoding, via the at least one sensor, the device locations in electrical signals; and
    transmitting, via the at least one sensor, the electrical signals to the computing system.

12. The method in claim 11, further comprising, decoding, via the computing system, the electrical signals to determine the device locations.

13. The method in claim 12, wherein the at least one of the plurality of physical objects is within a predetermined distance of the device locations.

14. The method in claim 10, further comprising generating, via the computing system, a messaging interface on a subset of mobile devices of the plurality of mobile devices associated with a subset of users of the plurality of users in at least one of the one or more groups in response to generating the message for each of the one or more groups.

15. The method in claim 14, wherein communications between the subset of mobile devices are established via the messaging interface.

16. The method in claim 15, wherein the communications are associated with information associated with the at least one physical object.

17. The method in claim 16, further comprising dynamically changing, via the computing system, the information associated with the at least one physical object based on the communications.

18. The method in claim 10, wherein the message is in a Short Messaging Service (SMS) format and is transmitted to the plurality of mobile devices from a proxy telephone number.

19. A dynamic alert system in a facility, the system comprising:
   one or more computer-readable media storing a database
   a computing system in communication with the database, the computing system in communication with the plurality of mobile devices, the computing system configured to:
   obtain device locations of the plurality of mobile devices;
   determine that the device locations coincide with one or more areas within a facility including a plurality of physical objects;
   group the plurality of mobile devices into one or more groups based on the device locations;
   generate a message for each of the one or more groups, wherein the content of the message is different for each group and includes information associated with at least one of the plurality of physical objects in the facility based on the one or more areas within the facility that coincide with the device locations;
   transmit each message on a messaging interface to the plurality of mobile devices in each of the one or more groups; and
   receive a plurality of communications between a subset of mobile devices of the plurality of mobile devices associated with at least one group of the one or more groups on the messaging interface; and
   in response to receiving each communication of the plurality of communications on the messaging interface, the computing system is configured to update information associated with at least one physical object in the database based on content of each communication.

20. The system of claim 19, wherein the computing system limits the communications on the messaging interface to a specified duration.

* * * * *